United States Patent [19]

Schrock et al.

[11] 3,936,242
[45] Feb. 3, 1976

[54] LINEAR MOTOR COOLING FAN

[75] Inventors: Martin Omer Schrock, Baltimore; John Earl Dibbern, Jr., Street, both of Md.

[73] Assignee: The Black and Decker Manufacturing Company, Towson, Md.

[22] Filed: Oct. 30, 1973

[21] Appl. No.: 411,296

[52] U.S. Cl. .................. 417/417; 417/368; 310/30
[51] Int. Cl.² .......................................... F04B 17/04
[58] Field of Search ........ 417/417, 368; 310/30, 12, 310/16

[56] References Cited
UNITED STATES PATENTS

| | | | |
|---|---|---|---|
| 1,541,334 | 6/1925 | Dremel | 310/16 |
| 1,837,197 | 12/1931 | Berman | 310/16 |
| 2,801,591 | 8/1957 | Parker | 417/417 |
| 3,172,121 | 3/1965 | Doyle et al. | 310/16 |
| 3,543,061 | 11/1970 | Wallace | 310/16 |
| 3,556,684 | 1/1971 | Rouquette | 417/417 |
| 3,788,778 | 1/1974 | Miller | 417/417 |
| 3,804,558 | 4/1974 | Naito | 417/417 |

*Primary Examiner*—C. J. Husar
*Attorney, Agent, or Firm*—Joseph R. Slotnik; Edward D. Murphy; Leonard Bloom

[57] ABSTRACT

A linearly reciprocating fan for cooling a linear motor which drives the fan is disclosed as including a fan blade attached to the linear motor and means for guiding the air flow caused by the reciprocating blade across the linear motor to cool the motor.

2 Claims, 5 Drawing Figures

LINEAR MOTOR COOLING FAN

BACKGROUND OF THE INVENTION

This invention relates to a fan for cooling a motor and, more particularly, to a linear reciprocating fan driven by a linear motor which the fan cools. The linear motor may be used to power a linear air compressor among other motorized devices.

With the growth of the consumer electrical appliance market, particularly with respect to power tools, there is a continual drive to reduce the costs of such appliances while maintaining their efficiency and performance. Manufacturing costs can be reduced in several ways and often most effectively by simplifying the manufacturing and assembly procedures and eliminating precision fits such as often is required with rotary elements.

In addition, most electrical appliances generate considerable heat during operation and it is desirable and often mandatory that forced cooling be effected. Rotating fans are commonly used in electric motor devices to provide such forced cooling; however, such fans are relatively expensive to include at least partially because of the support bearings and rotational balancing required for proper operation. Furthermore, they are not immediately suitable for linearly operating electric devices.

Accordingly, it is an object of this invention to provide a fan which has a highly efficient cooling capacity for a linearly operating, electrical appliance motor, and one which is inexpensive to manufacture and assemble, and reliable in use.

It is another objective of this invention to provide a linear fan of the character described for use in and with a linear motor which minimizes the number of parts required and which may be assembled as part of the appliance with relative ease and minimal expense.

Additional objectives and advantages of the invention will be set forth in part in the description which follows and in part will be obvious from the description, or may be learned by practice of the invention. The objectives and advantages of the invention may be realized and attained by means of the instrumentalities and combinations particularly pointed out in the appended claims.

BRIEF DESCRIPTION OF THE INVENTION

To achieve the foregoing objectives and in accordance with the purpose of the invention, as embodied and broadly described herein, the fan of this invention, which is intended for use with an electric linear reciprocating power source, for example, a linear electric motor powering a linear air compressor, and comprises a housing, a fan adapted to be operably connected to the reciprocating power source and supported within said housing for reciprocating motion therein.

Preferably the reciprocating power source includes a first means for producing a changing magnetic field, a second means responsive to the first means and being mounted for reciprocating motion and, preferably, the fan includes means for causing the fluid-flow affected by movement of the fan to flow across the reciprocating power source for cooling the power source.

The invention consists in the novel parts, constructions, arrangements, combinations and improvements shown and described. The accompanying drawing which is incorporated in and constitutes a part of the specification, illustrates one embodiment of this invention and, together with the description, serves to explain the principles of the invention.

DETAILED DESCRIPTION OF A PREFERRED EMBODIMENT OF THIS INVENTION

Reference will now be made in detail to the present preferred embodiment of this invention, an example of which is illustrated in the accompanying drawing.

This invention is a linear reciprocating fan driven by and in conjunction with a linear motor. While a variety of liner motors used to power various devices may be used, the present invention is particularly suited for use in the environment disclosed hereinafter, namely, a linear electric motor in a linear air compressor. However, it will be understood that this invention will have use in applications other than that specifically illustrated and described.

Figure 1:
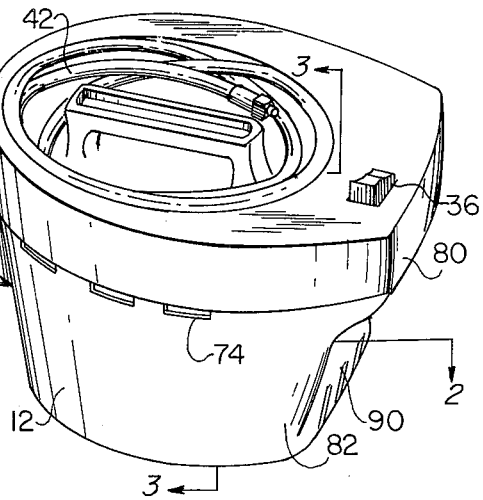
FIG. 1 is a perspective view of an electrical appliance of the type with which the fan of this invention can be used, the appliance illustrated being an air compressor driven by a linear electrical motor.
Figure 2A:
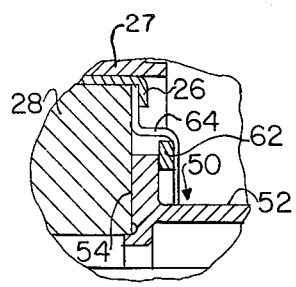
FIG. 2A is an enlarged view of the portion of FIG. 2 within the circle A.
Figure 2:
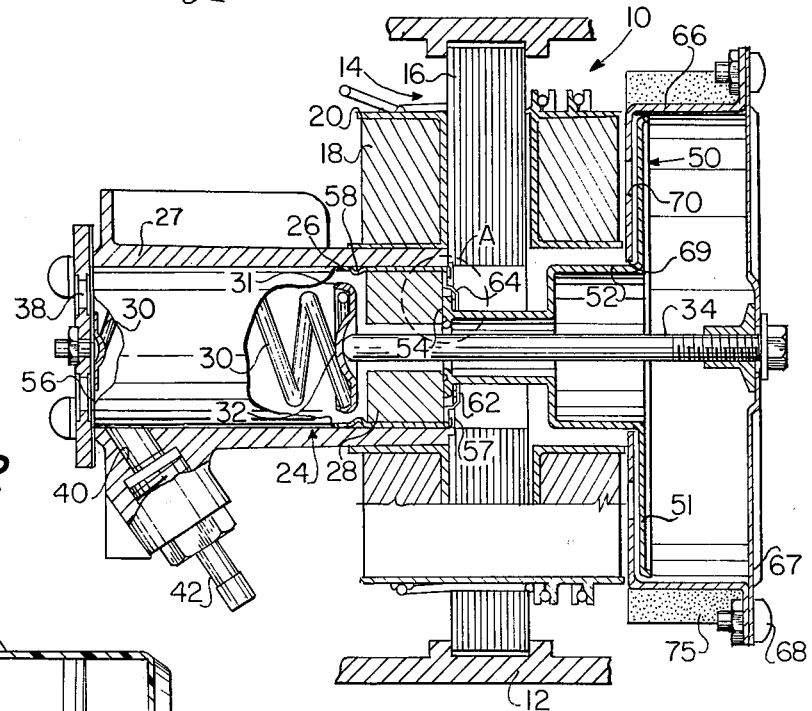
FIG. 2 is a partial sectional view taken along line 2—2 of FIG. 1.

With reference to FIGS. 1 and 2, there is shown a suitable linear reciprocating power source or motor 10, including a housing 12 and a field sub-assembly 14 including field laminations 16 supported within the housing 12 and having field windings 18 wound on a spool 20 surrounding the field laminations 16. The field windings 18 are connected, through a rectifer (not shown) to a conventional AC electrical power source (not shown) by means of a line cord 22.

An armature-piston sub-assembly 24 is mounted within the housing 12 and includes a piston 26, slidable in a cylinder 27 and having a plurality of magnetic armature-laminations 28 fixedly mounted adjacent one end thereof. A compression spring 30 is mounted within the piston 26 and is seated, at one end against a guide 31 which bears against a stationary rod 34 fixedly secured to the housing 12, through field sub-assembly 14.

In order to operate the motor 10, and on-off switch 36 is closed effecting, because of the rectification of the alternating current, a pulsating energization of the field windings 18 and field laminations 16 and, consequently, a pulsating magnetic field. The armature-piston sub-assembly 24, by virtue of the armature laminations 28 being magnetized by the magnetic field, is responsive to the field sub-assembly 14 and is drawn toward the center of the field sub-assembly effecting compression of the spring 30 as the piston 26 moves toward the center of the field laminations 16 (toward the right in FIG. 2). During deenergization of the field windings 18, resulting from the rectification of the alternating current, the spring 30 forces the piston sub-assembly 24 to return to its initial position away from the center of field laminations 16 (toward the left in FIG. 2).

This reciprocating linear motion of the piston 26 can be utilized in many ways, such as to drive a tool or to pump a fluid. For purposes of illustration, the embodiment shown in the drawing and described herein utilizes the linear motor 10 in an air compressor. The reciprocating piston 26 causes air to enter the compressor through inlet ports 38 past a suitable check valve, and to exit, once compressed, through a discharge port 40 also controlled by a suitable check valve. The compressed air leaving the port 40 is directed to its point of application through an air hose 42.

Energization of the field windings 18 and the movement of the piston 26 together with compression of the air produces a substantial amount of heat and it is necessary for the armature-piston sub-assembly 24 and the field sub-assembly 14 to be cooled. In accordance with this invention, a linear reciprocating fan driven by the linear motor 10 is provided to cool the motor 10.

Figure 3:
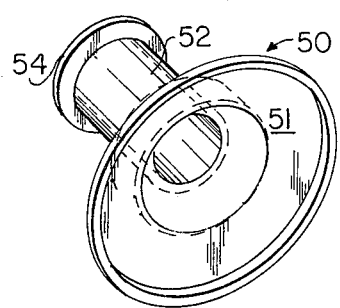
FIG. 3 is a perspective view of a fan formed in accordance with this invention.

As here embodied, a fan 50 including a fan blade, preferably in the form of a disc 51 is attached to the reciprocating portion of the power source, namely the piston 26 of the armature-piston sub-assembly 24. For simplification of manfacturing and assembly, the fan disc 51 is attached to the piston 26 by direct mechanical connection through a stepped cylindrical hub 52 terminating in a flange 54, all of which is formed as an integral part of the fan 50. For example, the fan 50 can be formed by molding a suitable plastic, such as Nylon or polypropylene, or by drawing sheet metal into the fan configuration best seen in FIGS. 2 and 3.

Preferably the fan is connected to the armature-piston sub-assembly 24 through use of the fange 54. This can be accomplished by forming the piston 26 as a drawn steel cup having a closed end 56 and an open end 57. An annular crimp 58 is rolled in the piston 26 adjacent the open end 57. The spring 30 and, if desired, a piston weight (not shown), is then loaded into the piston through the open end 57 and the dimpled cup-like spring guide 31 is placed over the spring. Annular armature laminations 28 are then inserted in the piston 26 so that they abut against the annular crimp 58 which prevents the laminations from moving further toward the closed end 56. The open end of the piston 26 is then deformed inwardly by rolling to secure all of the parts within the piston 26. The flange 54 of the fan 50 is then inserted over the last lamination followed by a retaining ring 62 and finally an end piece 64 (see FIG. 2A). Thus, the fan 50 may be removed for replacement or service by removal only of retaining ring 62.

The fan 50 and retaining ring 62 are open through their center in order to receive the rod 34 so that it abuts against the spring guide 31 at one end and is fixed with respect to the field sub-assembly 14 at its other end. In this manner the piston 26, laminations 28 and fan 50 are free to reciprocate longitudinally within the field sub-assembly 14 while the rod 34 is stationary. Movement of the piston 26 relative to the rod 34 effects compression and expansion of the spring 30.

In accordance with this invention the disc 51 of the fan 50 is fitted loosely within a flange, cup shaped fan housing 66, which housing is attached to the field sub-assembly 14, such as through a series of bolts (not shown). A bracket 67 is fixed to fan housing 66 by bolts 68 and supports the end of rod 34. An aperture 69 is formed through the housing and is sized to provide substantial clearance with the hub 52 to prevent interference with movement of the fan 50 and to simplify assembly. The fan housing 66 also is provided with a plurality of ports 70 through the face thereof. The ports 70 are located adjacent to the field sub-assembly 14 to cause the air set in motion by the fan 50 to circulate across the field sub-assembly 14.

In operation, the piston sub-assembly 24 reciprocates as a result of the pulsating energization of the field windings 18 causing the fan 50 to reciprocate linearly within the fan housing 66. While the rate of reciprocation can be selected to suit the application of the linear motor 10, it has been found that rectifying normal household current (60 cycle AC) to operate the motor 10 at 60 cycles per second is suitable for an air compressor. Reciprocation of the fan disc 51 causes air to enter and leave through the cooling ports 70 which sets up air current around the linear motor 10. It has been found that the air movement produced by a fan blade stroke of ½ to ¾ inch is sufficient to satisfactorily cool the field sub-assembly 14. Cooling air inlet apertures 74 and 90 are provided in the motor housing 14 to provide circulation of fresh air through the motor housing.

Further in accordance with this invention, an annular band of insulating material, such as a foamed polyurethane 75, can be placed about the fan housing 66 to dampen the noise generated by movement of the fan 50 and air and, furthermore, to serve as a seal so that the cooling air drawn into the housing at slots 74 and 90 and into the fan housing 66 is caused to circulate over those parts of the reciprocating power source 10 subject to heating during operation of the power source 10. Thus, air circulated over the linear motor 10 continues to mix with cool ambient air drawn in through apertures 74 and apertures 90 to prevent heated air from being trapped within housing 14.

Figure 4:
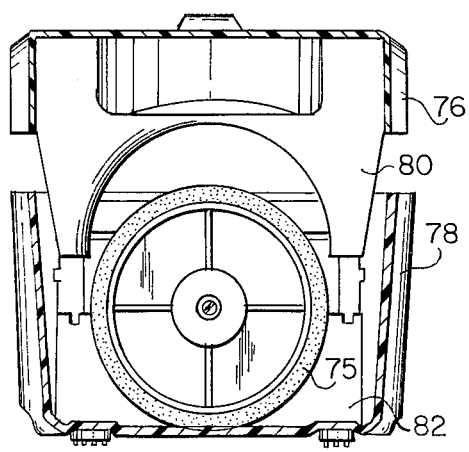
FIG. 4 is a partial exploded sectional view taken along line 3—3 of FIG. 1.

The field sub-assembly 14 is held by two primary housing sections, an upper section 76 and a lower section 78 which are bolted together (see FIG. 4). The band of foam material 75 is held in place by, for example, an adhesive backing, and is held in sealing engagement with the field subassembly 14 by baffle plates 80, 82 which are an integral part of the upper and lower sections 76, 78 respectively of the motor housing 14.

As can be seen from the above description and the drawing, the invention provides a linearly reciprocating fan for cooling those portions of the reciprocating power source which are subject to heating, which fan is very easy to fabricate and install and which is activated by direct connection to the reciprocating portion of the power source. The fan is a linear reciprocating member directly supported by the power source thereby not requiring bearings and other support structure usually required for rotating fans.

What is claimed is:

1. An electric linear air compressor comprising a housing, cooling air intake and discharge openings in said housing, a linear electric motor in said housing, piston means connected to said motor and operable therewith, compressed air intake and discharge means operable in conjunction with said piston means to deliver compressed air; the improvement which comprises a fan housing disposed adjacent said linear electric motor; a linear fan disposed in said fan housing and coupled to said motor for operation therewith; a plurality of openings in said fan housing adjacent said electric motor, said openings providing for the reciprocal flow of air therethrough upon movement of said fan; said reciprocal air flow into and out of said openings causing circulation of air about the exterior of said motor.

2. An electric linear air compressor comprising a housing, a linear electric motor mounted within said housing, said motor comprising a plurality of wound coils exposed within said housing; piston means connected to said motor and operable therewith, compressed air intake and discharge means operable in conjunction with said piston means to deliver compressed air; the improvement comprising a fan housing mounted adjacent to and in spaced relation with said wound coils, a plurality of openings through said fan housing adjacent said wound coils; a linear fan disposed within said fan housing and coupled to said linear motor for operation therewith, said fan drawing air into said fan housing through said openings and blowing air outwardly through said openings on alternate reciprocations of said motor to produce circulation of air over said wound coils during operation of said motor.

* * * * *